United States Patent
Takami et al.

(10) Patent No.: US 7,026,075 B2
(45) Date of Patent: Apr. 11, 2006

(54) NONAQUEOUS ELECTROLYTE BATTERY AND NONAQUEOUS ELECTROLYTIC SOLUTION

(75) Inventors: Norio Takami, Kanagawa-ken (JP); Haruchika Ishii, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 346 days.

(21) Appl. No.: 10/233,528

(22) Filed: Sep. 4, 2002

(65) Prior Publication Data

US 2003/0059684 A1    Mar. 27, 2003

(30) Foreign Application Priority Data

Sep. 26, 2001  (JP) ............................. 2001-295004

(51) Int. Cl.
*H01M 6/16*    (2006.01)

(52) U.S. Cl. ...................... 429/326; 429/207; 429/319; 429/325

(58) Field of Classification Search ............. 429/231.6, 429/218.1, 207, 319, 325, 326
See application file for complete search history.

(56) References Cited

U.S. PATENT DOCUMENTS

| | | | |
|---|---|---|---|
| 4,690,877 A * | 9/1987 | Gabano et al. ............. | 429/326 |
| 4,824,969 A * | 4/1989 | Austin et al. ................ | 549/230 |
| 4,894,302 A * | 1/1990 | Hoffman et al. ............ | 429/337 |
| 5,300,616 A * | 4/1994 | Friederichs .................. | 528/67 |
| 6,426,164 B1 * | 7/2002 | Yamaura et al. .......... | 429/231.6 |

FOREIGN PATENT DOCUMENTS

| | | | |
|---|---|---|---|
| JP | 61-176074 | | 8/1986 |
| JP | 06163080 A | * | 6/1994 |
| JP | 08-241731 | | 9/1996 |
| JP | 2000-164211 | | 6/2000 |

OTHER PUBLICATIONS

Jean-Pierre Pereira-Ramos, et al., "Sulfone-Based Electrolytes for Lithium Intercalation Batteries", Journal of Power Sources, vol. 16, 1985, pp. 193 - 204.

(Continued)

*Primary Examiner*—Dah-Wei Yuan
(74) *Attorney, Agent, or Firm*—Oblon, Spivak, McClelland, Maier & Neustadt, P.C.

(57) ABSTRACT

The present invention achieves an increased capacity and prolonged life of nonaqueous electrolyte batteries of the type in which light metals, such as magnesium, calcium or aluminum, are used in the negative electrode. The present invention also provides a thermally stable nonaqueous electrolytic solution for use with such batteries. The nonaqueous electrolyte battery in accordance with the present invention includes a positive electrode; a negative electrode containing at least one element selected from the group consisting of aluminum, calcium and magnesium; and a nonaqueous electrolytic solution composed of a mixed solvent of an organic solvent and an alkyl sulfone having a structure represented by $R_1R_2SO_2$, where $R_1$ and $R_2$ are each independently an alkyl group, and at least one type of salt selected from the group consisting of aluminum salt, calcium salt and magnesium salt. The organic solvent is capable of dissolving the alkyl sulfone along with at least one type of salt selected from the group consisting of aluminum salt, calcium salt and magnesium salt.

13 Claims, 1 Drawing Sheet

OTHER PUBLICATIONS

L. Legrand, et al., "Sulfone-Based Electrolytes for Aluminum Electrodeposition", Electrochemica Acta, vol. 40, No. 11, pp. 1711 - 1716.

U.S. Appl. No. 10/233,528, filed Sep. 4, 2002, Ishii et al.

U.S. Appl. No. 10/279,077, filed Oct. 24, 2002, Takami et al.

U.S. Appl. No. 10/233,528, filed Sep. 4, 2002, Takami et al.

U.S. Appl. No. 10/742,931, filed Dec. 23, 2003, Saruwatari et al.

* cited by examiner

NONAQUEOUS ELECTROLYTE BATTERY AND NONAQUEOUS ELECTROLYTIC SOLUTION

BACKGROUND OF THE INVENTION

1. Field of the Invention

The present invention relates to a nonaqueous electrolyte battery and a nonaqueous electrolytic solution.

2. Description of the Related Art

Nonaqueous electrolytic secondary batteries of the type that uses, as a material for the battery's negative electrode, a lithium metal, a lithium alloy, a lithium compound such as a metal oxide capable of storing and releasing lithium ions, or a carbon material are expected to find application as high-energy density batteries. Much effort has been devoted to developing nonaqueous electrolyte batteries with larger capacities. Of the materials for the negative electrodes, the carbon materials ensure a long battery life and safety despite the reduced capacity of the carbon material-made negative electrodes when compared to the lithium-based electrodes. For this reason, lithium-ion batteries having for example a positive electrode made of a lithium-cobalt oxide and a negative electrode made of the carbon material are widely used as the power source of various mobile equipment.

The batteries with a negative electrode made of lithium metal or capable of storing and releasing lithium ions can achieve a high battery voltage. Thus, the energy density of these batteries can be more readily increased than those of the conventional primary and secondary batteries. Nevertheless, a demand still exists for batteries with even larger capacity and longer battery life.

In one study conducted to develop batteries to meet such demand, a special composition was used to serve as the electrolytic solution in a lithium-based nonaqueous electrolyte battery in the hope of increasing the discharge efficiency of the battery. The composition was prepared by dissolving electrolytes such as lithium perchlorate in a sulfone-based electrolytic solution such as $DMSO_2$ (*Journal of Power Sources*, 16 (1985) 193–204). However, even these lithium-based batteries using such an electrolytic solution failed to provide sufficient characteristics to meet the above-described demand for the battery.

SUMMARY OF THE INVENTION

The present invention is directed to address the above-described problems. To this end, it is an objective of the present invention to increase the capacity of nonaqueous electrolyte batteries of the type in which light metals, such as aluminum, calcium or magnesium, are used in the negative electrode. It is another objective of the present invention to extend the battery life of such batteries. It is a further objective of the present invention to provide a thermally stable nonaqueous electrolytic solution for use with such batteries.

According to embodiments of the present invention, there is provided a nonaqueous electrolyte battery, which comprises a positive electrode; a negative electrode containing at least one element selected from the group comprising aluminum, calcium and magnesium; and a nonaqueous electrolytic solution comprising a mixed solvent of an organic solvent and an alkyl sulfone having a structure represented by $R_1R_2SO_2$, where $R_1$ and $R_2$ are each independently an alkyl group, and at least one type of salt selected from the group comprising aluminum salt, calcium salt and magnesium salt. The organic solvent is capable of dissolving the alkyl sulfone and at least one type of salt selected from the group comprising aluminum salt, calcium salt and magnesium salt.

Preferably, the alkyl sulfone used in the nonaqueous electrolyte battery is at least one selected from the group comprising dimethyl sulfone, diethyl sulfone, methyl ethyl sulfone and dipropyl sulfone, and the organic solvent is at least one selected from the group comprising of γ-butyrolactone, acetonitrile and propylenecarbonate.

According to embodiments of the present invention, there is also provided a nonaqueous electrolytic solution, which contains a mixed solvent of an organic solvent and an alkyl sulfone having a structure represented by $R_1R_2SO_2$, where $R_1$ and $R_2$ are each independently an alkyl group, and at least one type of salt selected from the group comprising of aluminum salt, calcium salt and magnesium salt. The organic solvent is capable of dissolving the alkyl sulfone along with at least one type of salt selected from the group comprising aluminum salt, calcium salt and magnesium salt.

DETAILED DESCRIPTION OF THE PREFERRED EMBODIMENTS

Figure 1:
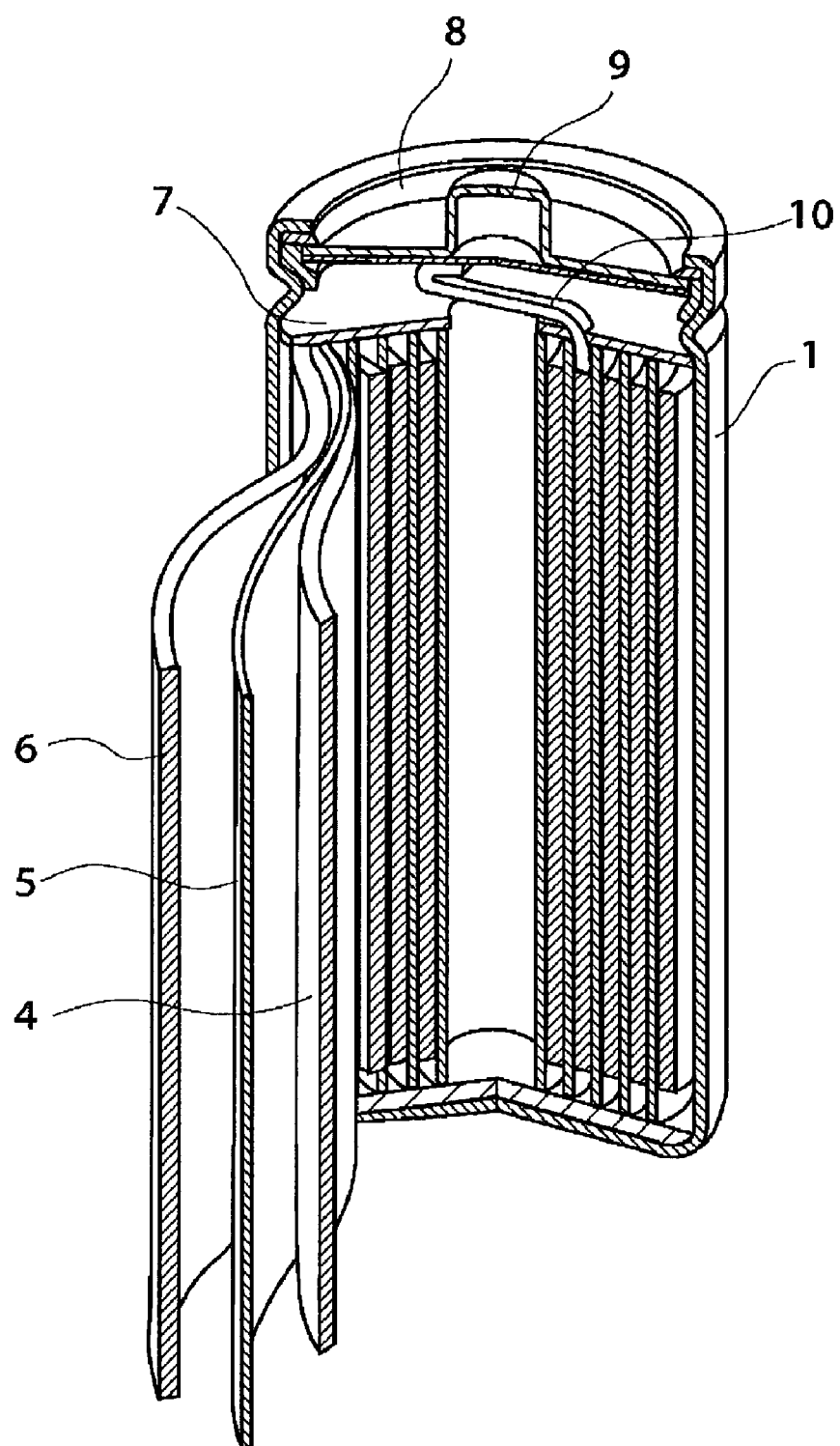
FIG. 1 is a partial cross-sectional view showing one embodiment of a cylindrical nonaqueous electrolyte battery in accordance with the present invention.

First, one example of a nonaqueous electrolyte battery in accordance with the present invention is described.

The nonaqueous electrolyte battery includes a case, which accommodates, along with nonaqueous electrolytic solution, a positive electrode and a negative electrode. The nonaqueous electrolytic solution is composed of a mixed solvent of an organic solvent and an alkyl sulfone with its structure represented by $R_1R_2SO_2$ (wherein $R_1$ and $R_2$ are each independently an alkyl group), and at least one selected from the group comprising aluminum salt, calcium salt and magnesium salt, dissolved in the mixed solvent. The organic solvent used is of the type capable of dissolving the alkyl sulfone together with aluminum salt, calcium salt, or magnesium salt.

In this manner, the present invention can achieve a nonaqueous electrolyte battery with an increased capacity, higher battery voltage and prolonged cycle life.

Each of the positive electrode, negative electrode, separator and case will be described in the following.

1) Positive Electrode

The positive electrode for use in the present invention includes a positive electrode collector and a positive electrode active material layer arranged on either one or both sides of the collector. The active material layer contains a positive electrode active material and a binder.

The positive electrode active material may be a metal compound such as a metal oxide or a conductive polymer. Examples of the metal oxide include lithium cobalt oxides (such as $LiCoO_2$), lithium nickel oxides (such as $LiNiO_2$), manganese oxides (such as $MnO_2$), lithium-manganese complex oxides (such as $LiMn_2O_4$), vanadium oxides and iron oxides. Dissolving lithium salt in the nonaqueous electrolytic solution, along with aluminum salt, calcium salt or magnesium salt, causes the positive electrode active material to incorporate lithium ions. As a result, a high voltage can be obtained, as can a high discharge capacity. For example, an EMF as high as 2.3V can be obtained when the battery using a LiCoO$_2$ positive electrode in combination with an Al negative electrode is fully charged.

Furthermore, the positive electrode active material may be a metal compound with its structure represented by L$_Z$M$_Y$(XO$_4$)$_n$ (wherein L represents Mg, Ca or Al; M represents at least one selected from the group comprising Fe, V, Co, Mn, Ni, Cu, Li, Na and K; X represents S, P, Mo, W or V; Z is an integer greater than or equal to 0; Y is an integer greater than or equal to 1; and n is an integer greater than or equal to 1.). Particular examples of the positive electrode active material in its charged state include Fe$_2$(SO$_4$)$_3$, Fe$_2$(MoO$_4$)$_3$, Fe$_2$(WO$_4$)$_3$, LiCoVO$_4$, LiNiVO$_4$, LiFe$_{0.5}$Mn$_{0.5}$PO$_4$, LiFePO$_4$, and LiCuVO$_4$.

When the battery is discharged, the positive electrode active material incorporates aluminum ions, calcium ions, or magnesium ions to form a metal compound containing aluminum, calcium, or magnesium. In this manner, it can serve as a secondary battery that releases aluminum ions, calcium ions, or magnesium ions when the battery is charged. As a result, the battery capacity is significantly increased. For example, the battery using the positive electrode active material in combination with an aluminum-based negative electrode can achieve an EMF of 1V to 3V and an increased positive electrode capacity that is twice to three times larger than that of a battery with a lithium-based negative electrode.

Examples of the aforementioned binder include polytetrafluoroethylene (PTFE), polyvinylidene fluoride (PVdF), and fluoride-containing rubber.

The positive electrode active material layer may further contain an electro-conductivity agent to reduce the internal resistance of the positive electrode. Examples of the electro-conductivity agent include acetylene black, carbon black and graphite.

Preferably, the respective proportions of the positive electrode active material, the electro-conductivity agent, and the binder to be blended in the positive electrode active material layer are from 80 to 95% by weight, from 3 to 20% by weight, and from 2 to 7% by weight.

A metal foil with a thickness of 1 to 20 μm is suitably used as the positive electrode collector. Particularly preferred are the metal foils coated with stainless steel, nickel, iron, molybdenum, tungsten, carbon film, TiN and TiC.

The positive electrode can be fabricated for example by suspending in a proper solvent the positive electrode active material, the electro-conductivity agent and the binder, coating the collector with the suspension, drying and then pressing the coated collector.

2) Negative Electrode

A metal or a metal compound containing at least one element selected from the group comprising aluminum, calcium, and magnesium may be used in the negative electrode for use in the present invention.

The metal may be either pure metal of aluminum, calcium, or magnesium or an alloy thereof. For example, aluminum or aluminum alloy may be used in the forms of metal foil or metal powder. The purity of aluminum is preferably 99% or higher. Examples of the aluminum alloy include aluminum-zinc alloy, aluminum-magnesium alloy, aluminum-chromium alloy, and aluminum-manganese alloy. The aluminum or aluminum alloy foil preferably has a thickness of 10 to 300 μm. The aluminum or aluminum alloy powder preferably has an average particle size of 5 to 500 μm. In manufacturing the negative electrode, the metal powder is mixed with the binder such as polytetrafluoroethylene (PTFE), polyvinylidene fluoride (PVdF), and fluoride-containing rubber. The mixture is then suspended in a proper solvent to form a coating suspension. The coating suspension is applied to the metal foil of stainless steel, nickel, iron or copper to serve as the collector. The coated collector is then dried and pressed to complete the negative electrode.

As in the case of aluminum, calcium and magnesium can also be used in the form of metal or alloy foil or powder to make the negative electrode.

Examples of the metal compound for use in the present invention containing aluminum, calcium, or magnesium include AlSb, Ca$_2$Si and Mg$_2$Si. As in the case of the above-described metal or the alloy, the metal compounds may also be used in the form of foil or powder to make the negative electrode.

3) Nonaqueous Electrolytic Solution

The nonaqueous electrolytic solution of the present invention is composed of a mixed solvent of an alkyl sulfone (R$_1$R$_2$SO$_2$, wherein R$_1$ and R$_2$ are each independently an alkyl group) and an organic solvent capable of dissolving the alkyl sulfone along with aluminum salt, calcium salt, or magnesium salt, and at least one selected from the group comprising aluminum salt, calcium salt, and magnesium salt dissolved in the mixed solvent. It should be appreciated to those skilled in the art that these salts may also be provided in the form of complex salts.

Examples of the alkyl sulfone (R$_1$R$_2$SO$_2$, wherein R$_1$ and R$_2$ are each independently an alkyl group) for use in the present invention include dimethyl sulfone, diethyl sulfone, methyl ethyl sulfone, dipropyl sulfone, and dibutyl sulfone.

The organic solvent for use in the present invention that is capable of dissolving the alkyl sulfone along with aluminum salt, calcium salt, or magnesium salt is an organic solvent composed of at least one selected from the group comprising cyclic carbonates such as propylene carbonate (PC), chain-like carbonates such as diethyl carbonate (DEC), γ-butyrolactone (γ-BL), acetonitrile (NL), cyclic ethers and chain-like ethers.

Preferably, the organic solvent is composed of at least one selected from the group comprising γ-butyrolactone (γ-BL), acetonitrile (NL) and propylene carbonate, each of which is capable of dissolving large amounts of any of aluminum salt, calcium salt and magnesium salt.

The mixing ratio of the alkyl sulfone to the organic solvent is in the range of 1:9 to 9:1. If the ratio is outside this range, the nonaqueous electrolytic solution may solidify at room temperature, resulting in a failure in the operation of the battery.

Examples of the aluminum salt for use in the present invention include halogenated aluminum such as AlCl$_3$, aluminum nitrate, aluminum sulfate, Al(BF$_4$)$_3$, Al(PF$_6$)$_3$, Al(ClO$_4$)$_3$, Al(CF$_3$SO$_3$)$_3$, and Al((C$_2$F$_5$SO$_2$)$_2$N)$_3$.

Examples of the calcium salt for use in the present invention include halogenated calcium such as CaCl$_2$, calcium nitrate, calcium sulfate, Ca(BF$_4$)$_2$, Ca(PF$_6$)$_2$, Ca(ClO$_4$)$_2$, Ca(CF$_3$SO$_3$)$_2$, and Ca((C$_2$F$_5$SO$_2$)$_2$N)$_2$.

Examples of the magnesium salt for use in the present invention include halogenated magnesium such as MgCl$_2$, magnesium nitrate, magnesium sulfate, Mg(BF$_4$)$_2$, Mg(PF$_6$)$_2$, Mg(ClO$_4$)$_2$, Mg(CF$_3$SO$_3$)$_2$, and Mg((C$_2$F$_5$SO$_2$)$_2$N)$_2$.

The aluminum salt, the calcium salt, or the magnesium salt is preferably dissolved in the mixed solvent of the alkyl sulfone and the organic solvent at a concentration of 0.1 to 3 mol/l.

Aside from the aluminum salt, calcium salt or magnesium salt, ammonium salt or lithium salt may be added to the nonaqueous electrolytic solution. Examples of the ammonium salt include tetraethylammonium chloride. Examples of the lithium salt include LiCl, LiAlCl$_4$, LiAl$_2$Cl$_7$, LiBF$_4$, LiPF$_6$, LiClO$_4$, LiCF$_3$SO$_3$, Li(CF$_3$SO$_2$)$_2$N, and Li(C$_2$F$_5$SO$_2$)$_2$N.

Rather than as the liquid form, the nonaqueous electrolytic solution of the present invention may be prepared as a gel form through the addition of a polymer material.

The use of the nonaqueous electrolytic solution of the present invention ensures the stable presence of aluminum ions (such as aluminum complex ions), calcium ions (such as calcium complex ions) or magnesium ions (such as magnesium complex ions) in the electrolytic solution. In this manner, the reaction through which aluminum, calcium, or magnesium dissolves or forms deposits is facilitated especially at the negative electrode. As a result, the capacity and the cycle life of the nonaqueous electrolyte battery of the present invention are significantly improved.

3) Separator

The nonaqueous electrolyte battery of the present invention may include a separator arranged between the positive electrode and the negative electrode. The separator serves to retain the liquid or the gel-like nonaqueous electrolyte.

The separator may be a porous film or a plastic-made non-woven fabric with a thickness of 5 to 100 μm and is made of materials such as polyethylene, polypropylene, cellulose and polyvinylidene fluoride (PVdF). In particular, the porous film made of polyethylene, polypropylene or combination of the two is preferred since it can ensure the safety of the secondary battery.

4) Case

The case for use in the present invention may take various shapes, including a bottomed cylinder, bottomed prism, coin-like shape and film. Examples of the material used to construct the case include metal cans and laminated film.

The metal can may be made of iron, stainless steel or nickel or may have its inner surface coated with a resin for insulation.

The laminated film preferably includes a metal layer and a resin layer disposed on either one or both sides of the metal layer. The film preferably has a thickness of 50 to 250 μm. The metal layer is preferably made from aluminum foil with a thickness of 10 to 150 μm, whereas the resin layer is made from a thermoplastic resin such as polyethylene and polypropylene. The resin layer may be formed into either single-layered or multi-layered structure.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

EXAMPLES

Example 1

The present invention will now be described in detail with reference to FIG. 1, in which one embodiment of the nonaqueous electrolyte battery of the present invention is depicted.

A reference numeral 1 denotes a stainless steel case generally shaped as a bottomed cylinder with an insulator 2 arranged at the bottom thereof. The case 1 accommodates a group of electrodes 3. A positive electrode 4, a separator 5, and a negative electrode 6 are sequentially layered to form a band-shaped body, which is rolled to give the general structure of the group of electrodes 3 with the negative electrode 6 being the outermost layer. The battery is 50 mm high and has an outer diameter of 14 mm.

The positive electrode 4 was prepared in the following manner: 2.5% by weight of acetylene black, 3% by weight of graphite, 4% by weight of polyvinylidene fluoride and an N-methylpyrrolidone (NMP) solution were added to 91% by weight of iron sulfate powder (Fe$_2$(SO$_4$)$_3$), and the components were thoroughly mixed. The resulting mixture was applied to surfaces of a collector made from stainless steel foil, which was previously coated with TiN to a thickness of 15 μm. The coated collector was then dried and pressed to obtain a band-shaped positive electrode 4 having an electrode density of 2.5 g/cm$^3$.

A 20 μm thick, polyethylene-made porous film was used to serve as the separator 5.

The negative electrode 6 was prepared in the following manner: 90% by weight of aluminum powder having the purity of 99.9% and average particle size of 30 μm, 5% by weight of acetylene black, 5% by weight of polyvinylidene fluoride, and an N-methylpyrrolidone (NMP) solution were added to one another and the components were thoroughly mixed. The resulting mixture was applied to surfaces of a 15 μm thick stainless steel foil. The coated foil was dried and pressed to obtain a band-shaped negative electrode 6 with an electrode density of 2 g/cm$^3$.

Also placed in the case 1 is a nonaqueous electrolytic solution, which is prepared by dissolving aluminum chloride (AlCl$_3$) in a mixed solvent of dipropyl sulfone and γ-butyrolactone (mixed at a volume ratio of 2:1) to a concentration of 1 mol/l. A piece of insulator paper 7 having an opening at the center thereof is placed atop the group of electrodes 3. Using swaging or similar technique, an insulative closure plate 8 is fitted in a top opening of the case 1 to seal the opening in a fluid-tight manner. A positive electrode terminal 9 is joined to the insulative closure plate 8 at the center thereof. The positive electrode terminal 9 is electrically connected to the positive electrode 4 of the group of electrodes 3 via a positive electrode lead. The negative electrode 6 of the group of electrodes 3 is electrically connected to the case 1 serving as the negative electrode terminal via a negative electrode lead (not shown).

Example 2

A nonaqueous electrolyte battery was made in the same manner as in Example 1, except that the nonaqueous electrolytic solution was prepared by dissolving Mg (ClO$_4$)$_2$ in a mixed solvent of dipropyl sulfone and γ-butyrolactone (mixed at a volume ratio of 2:1) at a concentration of 1 mol/l and magnesium metal foil was used to serve as the negative electrode.

Example 3

A nonaqueous electrolyte battery was made in the same manner as in Example 1, except that the nonaqueous electrolytic solution was prepared by dissolving Ca(ClO$_4$)$_2$ in a mixed solvent of dipropyl sulfone and γ-butyrolactone (mixed at a volume ratio of 2:1) at a concentration of 1 mol/l and calcium metal foil was used to serve as the negative electrode.

Example 4

A nonaqueous electrolyte battery was made in the same manner as in Example 1, except that the nonaqueous electrolytic solution was prepared by dissolving $LiAl_2Cl_7$ in a mixed solvent of dipropyl sulfone and γ-butyrolactone (mixed at a volume ratio of 2:1) at a concentration of 2 mol/l.

Example 5

A nonaqueous electrolyte battery was made in the same manner as in Example 1, except that the nonaqueous electrolytic solution was prepared by dissolving $LiAl_2Cl_7$ in a mixed solvent of dipropyl sulfone and acetonitrile (mixed at a volume ratio of 2:1) at a concentration of 2 mol/l.

Example 6

A nonaqueous electrolyte battery was made in the same manner as in Example 1, except that the nonaqueous electrolytic solution was prepared by dissolving $LiAl_2Cl_7$ in a mixed solvent of diethyl sulfone and acetonitrile (mixed at a volume ratio of 1:1) at a concentration of 2 mol/l.

Example 7

A nonaqueous electrolyte battery was made in the same manner as in Example 1, except that the nonaqueous electrolytic solution was prepared by dissolving $LiAl_2Cl_7$ in a mixed solvent of dimethyl sulfone and acetonitrile (mixed at a volume ratio of 1:1) at a concentration of 2 mol/l.

Example 8

A nonaqueous electrolyte battery was made in the same manner as in Example 1, except that the nonaqueous electrolytic solution was prepared by dissolving $LiAl_2Cl_7$ in a mixed solvent of dipropyl sulfone, propylenecarbonate and γ-butyrolactone (mixed at a volume ratio of 2:1:1) at a concentration of 2 mol/l.

Comparative Example 1

A nonaqueous electrolyte battery was made in the same manner as in Example 1, except that the nonaqueous electrolytic solution was prepared by dissolving $LiAl_2Cl_7$ in dipropyl sulfone at a concentration of 0.5 mol/l.

Comparative Example 2

A nonaqueous electrolyte battery was made in the same manner as in Example 1, except that the nonaqueous electrolytic solution was prepared by dissolving $LiAl_2Cl_7$ in γ-butyrolactone at a concentration of 1 mol/l.

Comparative Example 2

A nonaqueous electrolyte battery was made in the same manner as in Example 1, except that the nonaqueous electrolytic solution was prepared by dissolving $Ca(ClO_4)_2$ in acetonitrile at a concentration of 1 mol/l.

The discharge capacity and the cycle life of each of the batteries of Examples 1 through 8 and Comparative Examples 1 through 3 were measured by repeating the cycle of discharging each battery to 1V at a discharge current of 50 mA and charging each battery to 3V at a charge current of 50 mA.

The results are shown in Table 1 below.

TABLE 1

| | Positive electrode | Negative electrode | Electrolytic solution | | | Capacity (mAh) | Remaining capacity (%) |
|---|---|---|---|---|---|---|---|
| | | | Alkyl sulfone | Organic solvent | Electrolyte | | |
| Example 1 | $(Fe_2(SO_4)_3)$ | Al powder | dipropyl sulfone | γ-butyrolactone | $AlCl_3$ | 1000 | 85 |
| Example 2 | $(Fe_2(SO_4)_3)$ | Mg foil | dipropyl sulfone | γ-butyrolactone | $Mg(ClO_4)_2$ | 800 | 75 |
| Example 3 | $(Fe_2(SO_4)_3)$ | Ca foil | dipropyl sulfone | γ-butyrolactone | $Ca(ClO_4)_2$ | 800 | 70 |
| Example 4 | $(Fe_2(SO_4)_3)$ | Al powder | dipropyl sulfone | γ-butyrolactone | $LiAl_2Cl_7$ | 800 | 80 |
| Example 5 | $(Fe_2(SO_4)_3)$ | Al powder | dipropyl sulfone | acetonitrile | $LiAl_2Cl_7$ | 850 | 85 |
| Example 6 | $(Fe_2(SO_4)_3)$ | Al powder | diethyl sulfone | acetonitrile | $LiAl_2Cl_7$ | 800 | 80 |
| Example 7 | $(Fe_2(SO_4)_3)$ | Al powder | dimethyl sulfone | acetonitrile | $LiAl_2Cl_7$ | 700 | 70 |
| Example 8 | $(Fe_2(SO_4)_3)$ | Al powder | dipropyl sulfone | propylenecarbonate + γ-butyrolactone | $LiAl_2Cl_7$ | 780 | 80 |
| Comparative Example 1 | $(Fe_2(SO_4)_3)$ | Al powder | dipropyl sulfone | — | $LiAl_2Cl_7$ | 600 | 10 |
| Comparative Example 2 | $(Fe_2(SO_4)_3)$ | Al powder | — | γ-butyrolactone | $LiAl_2Cl_7$ | 400 | 0 |
| Comparative Example 3 | $(Fe_2(SO_4)_3)$ | Ca | — | acetonitrile | $Ca(ClO_4)_2$ | 600 | 0 |

The capacity and the remaining capacity after 200 cycles (% with respect to the initial capacity) are shown in Table 1 for each of the batteries of Examples 1 through 8 and Comparative Examples 1 through 3.

As can be seen from Table 1, each of the nonaqueous electrolyte batteries of Examples 1 through 8 proved to have a larger capacity and longer life as compared to the batteries of Comparative Examples 1 through 3.

As set forth, the battery using the nonaqueous electrolytic solution of the present invention achieves a large capacity, high voltage, and prolonged cycle life and can thus provide a high-performance secondary battery suitable for use as the power source for various mobile equipment. Further, the nonaqueous electrolytic solution of the present invention serves as a thermally stable electrolytic solution that can achieve a large capacity as well as prolonged life of the battery. Thus, the nonaqueous electrolytic solution of the present invention is particularly suited to batteries for use in mobile equipment.

What is claimed is:
1. A nonaqueous electrolyte battery, comprising:
a positive electrode;
a negative electrode comprising at least one element selected from the group consisting of aluminum, calcium and magnesium; and a nonaqueous electrolytic solution comprising a mixed solvent of an organic solvent and an alkyl sulfone having a structure represented by $R_1R_2SO_2$, where $R_1$ and $R_2$ are each independently an alkyl group, and at least one salt selected from the group consisting of aluminum salt, calcium salt and magnesium salt, wherein said alkyl sulfone is at least one alkyl sulfone selected from the group consisting of dimethyl sulfone, and dipropyl sulfone, and wherein said organic solvent is at least one selected from the group consisting of propylene carbonate, γ-butyrolactone and, acetonitrile.

2. The nonaqueous electrolyte battery according to claim 1, wherein said positive electrode comprises a positive electrode active material comprising a metal oxide.

3. The nonaqueous electrolyte battery according to claim 2, wherein said metal oxide is at least one metal oxide selected from the group consisting of lithium-cobalt oxides, lithium-nickel oxides, manganese oxides, lithium-manganese oxides, vanadium oxides, and iron oxides.

4. The nonaqueous electrolyte battery according to claim 1, wherein said positive electrode comprises a positive electrode active material comprising a metal compound.

5. The nonaqueous electrolyte battery according to claim 4, wherein said metal compound has a structure represented by $L_zM_y(XO_4)_n$, where L represents Mg, Ca or Al; M represents at least one element selected from the group consisting of Fe, V, Co, Mn, Ni, Cu, Li, Na and K; X represents S, P, Mo, W or V; Z is an integer greater than or equal to 0; Y is an integer greater than or equal to 1; and n is an integer greater than or equal to 1.

6. The nonaqueous electrolyte battery according to claim 1, wherein said negative electrode comprises at least one pure metal selected from the group consisting of aluminum, calcium, and magnesium, or an alloy thereof.

7. The nonaqueous electrolyte battery according to claim 1, wherein said negative electrode comprises at least one compound selected from the group consisting of AlSb, $Ca_2Si$ and $Mg_2Si$.

8. The nonaqueous electrolyte battery according to claim 1, wherein said mixed solvent has a mixing ratio of said alkyl sulfone to said organic solvent in the range of 1:9 to 9:1.

9. The nonaqueous electrolyte battery according to claim 1, wherein said aluminum salt is at least one aluminum salt selected from the group consisting of halogenated aluminum, aluminum nitrate, aluminum sulfate, $Al(BF_4)_3$, $Al(PF_6)_3$, $Al(ClO_4)_3$, $Al(CF_3SO_3)_3$, and $Al((C_2F_5SO_2)_2N)_3$.

10. The nonaqueous electrolyte battery according to claim 1, wherein said calcium salt is at least one calcium salt selected from the group consisting of a halogenated calcium, calcium nitrate, calcium sulfate, $C_a(BF_4)_2$, $Ca(PF_6)_2$, $Ca(ClO_4)_2$, $Ca(CF_3SO_3)_2$, and $Ca((C_2F_5SO_2)_2N)_2$.

11. The nonaqueous electrolyte battery according to claim 1, wherein said magnesium salt is at least one magnesium salt selected from the group consisting of halogenated magnesium, magnesium nitrate, magnesium sulfate, $Mg(BF_4)_2$, $Mg(PF_6)_2$, $Mg(ClO_4)_2$, $Mg(CF_3SO_3)_2$, and $Mg((C_2F_5SO_2)_2N)_2$.

12. The nonaqueous electrolyte battery according to claim 1, wherein said aluminum salt, said calcium salt or said magnesium salt is dissolved in said mixed solvent of said alkyl sulfone and said organic solvent at a concentration of 0.1 to 3 mol/l.

13. A nonaqueous electrolytic solution comprising:

a mixed solvent of an organic solvent and an alkyl sulfone having a structure represented by $R_1R_2SO_2$, with $R_1$ and $R_2$ being each independently an alkyl group, and at least one salt selected from the group consisting of aluminum salt, calcium salt and magnesium salt, wherein said organic solvent dissolves said alkyl sulfone and said at least one salt in said nonaqueous electrolytic solution, wherein said alkyl sulfone is at least one selected from the group consisting of dimethyl sulfone, diethyl sulfone, and dipropyl sulfone, and wherein said organic solvent is at least one selected from the group consisting of propylene carbonate, γ-butyrolactone and acetonitrile.

* * * * *